2,913,425

PROCESS FOR THE MANUFACTURE OF SYNTHETIC RESINS

Karl E. Müller, Leverkusen-Bayerwerk, and Peter Hoppe, Troisdorf, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application June 8, 1954
Serial No. 435,370

Claims priority, application Germany June 16, 1953

2 Claims. (Cl. 260—2.5)

This invention relates to an improved process for the manufacture of synthetic resins and, more particularly, to the reaction of isocyanates with compounds containing hydroxyl groups in the presence of catalysts.

It is known to accelerate the reaction of mono- or polyisocyanates with compounds containing hydroxyl or carboxyl groups by the addition of tertiary amines. The acceleration in the reaction brought about by these products is utilized in the reaction of either low or high molecular weight compounds containing hydroxyl or carboxyl groups with mono- or diisocyanates. Compounds containing hydroxyl groups react with diisocyanates to give high molecular weight synthetic resin products which can be used as plastics. The use of accelerators is of special importance in the manufacture of synthetic resins based on diisocyanates. This process often requires the reaction to be carried out at a definite velocity in order to obtain a synthetic resin with good working properties; the working properties of the final product also depend on the degree of condensation. Both the reaction velocity and the degree of condensation are substantially influenced by the nature of the accelerating catalyst.

The catalysts previously employed were tertiary amines such as hexahydro-dimethylaniline. The accelerating action of these tertiary amines, even when they are used in very small quantities, is often so intense that the polyaddition reaction goes too far, and consequently the mechanical properties, especially the tensile strength, of the resulting products degenerate. Tertiary amines are neither soluble in water nor emulsifiable by means of emulsifiers. This is troublesome, since water, as a component containing hydroxyl groups, is of great importance as a cross-linking agent in the manufacture of synthetic resins based on isocyanates. Moreover, the tertiary amines are not altogether satisfactory from the physiological point of view. Many tertiary amines give off an intense odor which adheres to the resulting synthetic resin for a long time.

An object of the invention is to provide synthetic resins, especially synthetic resins having a porous structure, derived from polyisocyanates, especially diisocyanates, and compounds containing hydroxyl groups.

Another object is to provide an improved process for the manufacture of synthetic resins, especially synthetic resins having a porous structure, derived from polyisocyanates, especially diisocyanates, and compounds containing hydroxyl groups.

A still further object is to provide slowly effective accelerators for such a process.

Further objects of the invention will become apparent as the following description proceeds.

In accordance with the invention it has been found that tertiary amines containing at least one ester group in the molecule are excellent accelerators in the reaction of polyisocyanates with compounds containing hydroxyl groups.

In tertiary amines containing at least one ester group in the molecule, the basicity of the tertiary nitrogen atom is diminished by the ester group, so that the reaction between the isocyanates and the compounds containing hydroxyl groups proceeds at an essentially lower velocity in the presence of such ester amines than when the reaction is carried out in the presence of the above described, previously used, accelerators.

Since the reaction proceeds at a reduced velocity, the products have very good working properties, especially mechanical properties. The tear resistance is especially improved. Moreover, amines containing ester groups are partially water-soluble, or at least easily emulsifiable in water. The majority of the resulting synthetic resins have a low vapor pressure and are completely odorless.

Ester amines containing at least one ester group in the molecule, which are used according to the invention as slowly effective accelerators, can be obtained in known manner by thermal esterification of mono- or dicarboxylic acids with mono- or polyhydroxyl compounds containing one or more tertiary nitrogen atoms. These ester amines are especially useful accelerators in the manufacture of foamed products derived from isocyanate-modified polyesters.

The invention is further illustrated by the following examples without being restricted thereto; the parts given being by weight.

*Example 1*

50 parts of toluene diisocyanate are added with stirring to 100 parts of a polyester prepared from trimethylol propane and adipic acid. After some minutes a solution of 1 part of an ester amine, prepared from N-diethyl ethanolamine and adipic acid, in 1.5 parts of water is added with stirring. After a short time the mass begins to expand and a completely cured foam results after about 1 hour.

*Example 2*

A solution of 3 parts of N-diethyl ethanol amine acetate in 2 parts of water is added with stirring to 100 parts of an isocyanate-modified polyester prepared from glycol adipic acid polyester (hydroxyl number 150) in 33 grams of toluylene diisocyanate. After a short time reaction starts and an expanded material with excellent properties results after about 30 minutes.

*Example 3*

A solution of 3 parts of methyl diethanolamine acetate in 2 parts of water is added with stirring to 100 parts of an isocyanate-modified polyester prepared from glycol adipic acid polyester (hydroxyl number 50) and 20 parts of toluylene diisocyanate. After 30 minutes a finely porous, highly elastic material results.

We claim:

1. In a process for the preparation of a foamed polyurethane by the reaction between an organic diisocyanate, a polyester of a polycarboxylic acid and a polyhydric alcohol, and water, the improvement comprising conducting said reaction in the presence of a catalytic amount of an ester amine prepared from N-diethyl ethanolamine and adipic acid, said ester amine being readily emulsifiable in water and the resulting foamed product being odorless.

2. In a process for the preparation of a foamed polyurethane by the reaction between an organic diisocyanate, a polyester of a polycarboxylic acid and a polyhydric alcohol, and water, the improvement comprising conducting said reaction in the presence of a catalytic amount of an ester amine prepared by the esterification of a dicarboxylic acid with an N-dialkyl ethanolamine, said ester amine being readily emulsifiable in water, and the resulting foamed product being odorless.

References Cited in the file of this patent

UNITED STATES PATENTS

| | | |
|---|---|---|
| 2,625,532 | Seeger | Jan. 13, 1953 |
| 2,650,212 | Windemuth | Aug. 25, 1953 |
| 2,764,565 | Hoppe | Sept. 25, 1956 |
| 2,788,332 | Muller et al. | Apr. 9, 1957 |

FOREIGN PATENTS

| | | |
|---|---|---|
| 152,153 | Australia | July 2, 1953 |